United States Patent Office 3,079,389
Patented Feb. 26, 1963

3,079,389
ANTHRAQUINONE VAT DYESTUFFS DERIVED FROM 1-AMINOANTHRAQUINONE-2-CARBOXYLIC ESTERS
Walter Kern, Sissach, and Jacob Koch, Basel, Switzerland, assignors to Ciba Limited, Basel, Switzerland
No Drawing. Filed Nov. 16, 1959, Ser. No. 852,938
Claims priority, application Switzerland Nov. 21, 1958
10 Claims. (Cl. 260—249)

This invention provides anthraquinone vat dyestuffs which contain in the 1-position an amino group, in the 2-position a carboxylic acid ester group and in at least one further α-position an amino group substituted by a carboxylic acid radical or a heterocyclic radical containing at least once the grouping

in the ring.

The invention also provides a process for the manufacture of the aforesaid dyestuffs wherein an anthraquinone-2-carboxylic acid ester, which contains in the 1-position an amino group and in at least one further α-position an acylatable amino group, is reacted with a dicarboxylic acid halide or a heterocyclic compound which contains at least once the grouping

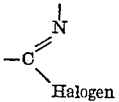

in the ring, and, when the reaction product so obtained contains mobile halogen atoms, such atoms are replaced by the radicals of alkylamines or arylamines.

Of special interest as starting materials are 1:4-diaminoanthraquinone-2-carboxylic acid esters of the formula (1)

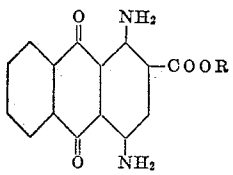

in which R represents an organic radical. In addition to the substituents indicated above, the starting materials may contain further substituents, for example, halogen atoms or alkyl, alkyl sulfonyl, arylsulfonyl, alkylsulfonamide or cyano groups in the anthraquinone molecule. The carboxylic acid ester group is advantageously derived from a lower aliphatic or cycloaliphatic or araliphatic alcohol, for example, methyl alcohol, ethyl alcohol, propyl alcohol, isopropyl alcohol, butyl alcohol, isobutyl alcohol, hexyl alcohol, cyclohexyl alcohol, benzyl alcohol, phenyl ethyl alcohol or α-furyl-methyl alcohol.

The dicarboxylic acid halides used as acylating agents are advantageously derived from aromatic dicarboxylic acids, for example, terephthalic acid, isophthalic acid, naphthalene-2:6-dicarboxylic acid, azobenzene, 4:4′-dicarboxylic acid, azodiphenyl-4:4″-dicarboxylic acid, fluoranthene-4:12-dicarboxylic acid, benzanthrone-2:6-dicarboxylic acid, anthraquinone-2:6-dicarboxylic acid or dicarboxylic acids of the general formula

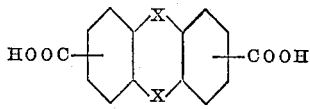

in which each X represents —O—, —S—, —SO— or —SO₂, for example, diphenylene dioxide dicarboxylic acids and especially thianthrene dicarboxylic acids. As further examples of heterocyclic carboxylic acids there may be mentioned diphenylene oxide dicarboxylic acids, diphenylene sulfide dicarboxylic acids and 2:5-diphenyl oxdiazole dicarboxylic acids.

Among the heterocyclic compounds which contain at least once the grouping

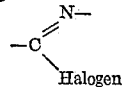

in the ring, and may be used as acylating agents there may be mentioned more especially 1:3:5-triazines of the formula (2)

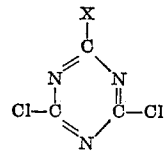

in which X represents a chlorine atom or a hydrogen atom or a lower alkyl radical, for example, a methyl or ethyl radical, or an aryl radical, more especially a benzene radical, for example, the phenyl, 3- or 4-methyl-phenyl, 2:4-dimethylphenyl, 2- or 3-methoxyphenyl, 4-chlorophenyl, 3:4-dichlorophenyl or phenoxy group. In addition to triazines, there may be mentioned diazines, for example, 2:4-dichloropyrimidine,
2:4-dibromopyrimidine,
2:4-dichloro-6-methylpyrimidine,
2:4-dichloro-6-phenylpyrimidine,
2:5-dichloropyrazine,
2:4-dichloroquinazoline,
2:4-dichloro-6:7-benzoquinazoline,
2:4-dichloro-6:7-phthaloylquinazoline,
2-phenyl-4-chloro-6:7-phthaloylquinazoline,
2-(anthraquinonyl-2′)-4-chloro-quinazoline,
1:3-di-(4′-chloro-6′:7′-phthaloyl-quinazolyl-2′)-benzene,
1:4-dichlorophthalazine, and
4:4′-dichloro-6:6′-diphenyl-1:1′-3:3′-bis-diazine.

The relative proportions are advantageously so chosen that one molecular proportion of a dicarboxylic acid chloride or of an acylating agent containing at least two exchangeable halogen atoms reacts with 2 molecular proportions of the diaminoanthraquinone-2-carboxylic acid ester. The replacement of the halogen atoms in the diazine or triazine may be carried out in stages. The first halogen atom may, for example, be exchanged for the radical of a diamino-2-carboxylic acid ester and the second halogen atom for the radical of a diamino-2-carboxylic acid ester identical with or different from that referred to above or of any desired aminoanthraquinone. In cyanuric chloride there are three exchangeable halogen atoms of which advantageously two are exchanged for diaminoanthraquinone-2-carboxylic acid ester radicals. Under energetic conditions the third halogen atom can also be exchanged for an amino group, for example, by heating the product with a primary or secondary aliphatic or aromatic amine, for example, aniline, N-methyl aniline, N-ethyl aniline, methylamine, ethylamine, dimethylamine or di-(hydroxyethyl)-amine.

The same dyestuffs can also be obtained with advantage by reacting, instead of cyanuric chloride, a trichlorotriazine, in which one chlorine atom has been exchanged for one of the aforesaid amine radicals, with 2 mols of the diaminoanthraquinone carboxylic acid ester.

The condensation is advantageously carried out by reacting the diaminoanthraquinone carboxylic acid ester with the acylating agent in a solvent or a suspension medium, for example, nitrobenzene, trichlorobenzene, chlorobenzene, naphthalene, toluene or glacial acetic acid, for a sufficient time, the temperature generally being within the range of 90° C. to 210° C., and if necessary with the addition of a condensing agent, for example, cuprous chloride, and if desired in the presence of another agent, for example, an agent capable of binding hydrogen halide. The solvent may be dispensed with, by simply melting the components together, if desired, in the presence of necessary additions. Under the aforesaid conditions only amino groups in the 4-, 5- or 8-position are acylated, and the amino group in the 1-position remains free owing to the steric hindrance of the carboxylic acid ester group.

The dyestuffs of this invention are suitable for dyeing or printing a very wide variety of materials, especially for dyeing or printing fibers of natural or regenerated cellulose. The dyeings so produced are distinguished by their good properties of fastness, especially their fastness to chlorine. The dyestuffs can also be used as pigments. Of special interest are dyestuffs of the formula:

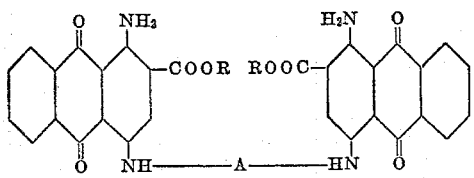

in which R represents an organic radical, and A represents the radical of a dicarboxylic acid or a diazine or triazine radical. These dyestuffs dye cellulose fibers blue to violet tints of excellent fastness to light, chlorine and soda boiling. It is very surprising that the carboxylic acid ester groups are not hydrolyzed under the strongly alkaline conditions of vatting and the soda boiling test.

The following examples illustrate the invention, the parts and percentages being by weight:

*Example 1*

A mixture of 2.26 parts of 4-phenyl-2:6-dichloro-1:3:5-triazine, 6.2 parts of 1:4-diaminoanthraquinone-2-carboxylic acid ethyl ester and 168 parts of trichlorobenzene is stirred for 3 hours at 170 to 173° C., then allowed to cool, suction-filtered, and the filter cake is washed with methanol and dried, to yield 6.9 parts of a blue dyestuff which dyes cotton from a red-brown vat very fast, pure reddish blue tints.

*Example 2*

A mixture of 2.26 parts of 4-phenyl-2:6-dichloro-1:3:5-triazine, 6.76 parts of 1:4-diaminoanthraquinone-2-carboxylic acid isobutyl ester and 168 parts of trichlorobenzene is stirred for 3 hours at 170–173° C., allowed to cool, suction-filtered, and the filter cake is washed with methanol and dried, to yield 6 parts of a blue dyestuff which dyes cotton from a red-brown vat very fast, pure reddish blue tints.

*Example 3*

A mixture of 2.26 parts of 4-phenyl-2:6-dichloro-1:3:5-triazine, 7.26 parts of 1:4-diaminoanthraquinone-2-carboxylic acid cyclohexyl ester and 168 parts of trichlorobenzene is stirred for 3 hours at 170–173° C., then allowed to cool, suction-filtered, and the filter cake is washed with methanol and dried, to yield 6.4 parts of a blue dyestuff which dyes cotton from a red-brown vat very fast, pure reddish blue tints.

*Example 4*

A mixture of 2.26 parts of 4-phenyl-2:6-dichloro-1:3:5-triazine, 7.2 parts of 1:4-diaminoanthraquinone-2-carboxylic acid phenyl ester and 168 parts of trichlorobenzene is stirred for 3 hours at 170–173° C., then allowed to cool, suction-filtered, and the filter cake is washed with methanol and dried, to yield 7.8 parts of a blue dyestuff which dyes cotton from a red-brown vat reddish blue tints which are fast to light.

1:4-diaminoanthraquinone-2-carboxylic acid phenyl ester is prepared in the following manner:

A mixture of 1-amino-4-nitroanthraquinone-2-carboxylic acid chloride and phenol is stirred for 6 hours at 100° C., then allowed to cool to 60–70° C., diluted with alcohol, suction-filtered, and the filter cake is washed with alcohol, and dried. The resulting 1-amino-4-nitroanthraquinone-2-carboxylic acid phenyl ester forms orange-red crystals melting at 239–241° C. On reduction with sodium hydrosulfite the 1:4-diaminoanthraquinone-2-carboxylic acid phenyl ester is obtained in small blue crystals melting at 249–251° C.

Similar dyestuffs are obtained when ortho- or para-chlorophenyl ester is used instead of 1:4-diaminoanthraquinone-2-carboxylic acid phenyl ester.

*Example 5*

3.4 parts of 1:4-diaminoanthraquinone-2-carboxylic acid isobutyl ester are heated in 30 parts of nitrobenzene. At 130° C. 1.06 parts of isophthalic acid dichloride are added, and the mixture is stirred for 2 hours at 170–180° C. and then allowed to cool. The condensation product is suctioned off, washed with alcohol and dried, to yield 3.7 parts of a violet dyestuff which dyes cotton from a red vat very fast, pure violet tints.

When instead of the isobutyl ester the cyclohexyl ester of 1:4-diaminoanthraquinone-2-carboxylic acid is used, a dyestuff is obtained which has similar properties.

When the dichloride of isophthalic acid is replaced by a dichloride of another dicarboxylic acid, similar dyestuffs are obtained, the vat colours of which and the tints of their dyeings on cotton are shown in the following table:

| | Dichloride used is that of— | Ester of 1:4-diaminoanthraquinone-2-carboxylic acid used | Colour of vat | Tint on cotton |
|---|---|---|---|---|
| 1 | Terephthalic acid | Isobutyl | Red-brown | Navy. |
| 2 | ___do___ | Cyclohexyl | ___do___ | Do. |
| 3 | Azobenzene-4:4'-dicarboxylic acid | Isobutyl | ___do___ | Grey. |
| 4 | Azodiphenyl-para-para'-dicarboxylic acid | ___do___ | ___do___ | Do. |
| 5 | Thianthrene-dicarboxylic acid | ___do___ | Red | Navy. |
| 6 | ___do___ | Cyclohexyl | ___do___ | Do. |
| 7 | Fluoranthene-4:11-dicarboxylic acid | Isobutyl | Brown | Grey. |
| 8 | ___do___ | Cyclohexyl | Yellowish brown | Currant. |
| 9 | Fumaric acid | Isobutyl | Brown | Navy. |

*Example 6*

A mixture of 1 part of 2:4-dichloro-quinazoline, 4 parts of 1:4-diaminoanthraquinone-2-carboxylic acid isobutyl ester and 40 parts of nitrobenzene is heated at the boil for 8 hours, then allowed to cool, and the condensation product is suctioned off, washed with alcohol and dried; it dyes cotton from a red-brown vat fast greenish blue tints.

*Example 7*

3.4 parts of 1:5-diaminoanthraquinone-2-carboxylic acid isobutyl ester are heated in 30 parts of nitrobenzene. At 130° C. 1.06 parts of terephthalic acid dichloride are added and the mixture is stirred for 2 hours at 170 to 180° C., and allowed to cool. The condensation product is suctioned off, washed with alcohol and dried, to yield 3.2 parts of a red-brown dyestuff which dyes cotton from a red-brown vat fast copper-red tints.

When isophthalic acid dichloride is used instead of terephthalic acid dichloride, a dyestuff is obtained having similar properties, while the condensation product obtained from fluoranthene-4:11-dicarboxylic acid dichloride and 1:5-diaminoanthraquinone-2-carboxylic acid isobutyl ester dyes cotton reddish orange tints.

Example 8

A mixture of 2.26 parts of 4-phenyl-2:6-dichloro-1:3:5-triazine, 6.48 parts of 1:4-diaminoanthraquinone-2-carboxylic acid-n-propyl ester and 168 parts of trichlorobenzene is stirred for 3 hours at 170–173° C., then allowed to cool, suction-filtered, and the filter cake is washed with methanol and dried, to yield 6.6 parts of a blue dyestuff which dyes cotton from a red-brown vat very fast, pure reddish blue tints. Notwithstanding its content of an ester group, the dyestuff is still fast to washing and boiling in soda solution.

The following table lists further dyestuffs in which the ester group is varied and which have similar tinctorial properties. They can be prepared as described in the first paragraph above.

| | 1:4-diaminoanthraquinone-2-carboxylic acid ester | Colour of vat | Tint of dyeing on cotton |
|---|---|---|---|
| 1 | 1:4-diaminoanthraquinone-2-carboyxlic acid isopropyl ester. | Red-brown | Pure reddish blue. |
| 2 | 1:4-diaminoanthraquinone-2-carboxylic acid benzyl ester. | ...do........ | Do. |
| 3 | 1:4-diaminoanthraquinone-2-carboxylic acid n-butyl ester. | ...do........ | Do. |
| 4 | 1:4-diaminoanthraquinone-2-carboxylic acid sec. butyl ester. | ...do........ | Reddish blue. |
| 5 | 1:4-diaminoanthraquinone-2-carboxylic acid phenyl-ethyl ester. | Red........ | Pure reddish blue. |

Example 9

A mixture of 2.26 parts of 4-phenyl-2:6-dichloro-1:3:5-triazine, 5.92 parts of 1:4-diaminoanthraquinone-2-carboxylic acid methyl ester and 168 parts of trichlorobenzene is stirred for 3 hours at 170–173° C., then allowed to cool, suction-filtered, and the residue is washed with methanol and dried, to yield 6.1 parts of a blue powder which dyes cotton from a red-brown vat very fast, pure reddish blue tints.

Similar, slightly more neutral blue tints are obtained when the methyl ester of 1:4-diaminoanthraquinone-2-carboxylic acid is replaced by the amyl or cyclopentyl ester of that acid.

Example 10

A mixture of 1.13 parts of 4-phenyl-2:6-dichloro-1:3:5-triazine, 3.22 parts of 1:4-diaminoanthraquinone-2-carboxylic acid allyl ester and 84 parts of trichlorobenzene is stirred for 3 hours at 170–173° C., allowed to cool, suction-filtered, and the residue is washed with a small quantity of trichlorobenzene and then with methanol, and then dried, to yield a blue crystalline powder which dyes cotton from a red-brown vat pure reddish blue tints which are fast to light and chlorine.

Similar dyestuffs are obtained by using an ester of 1:4-diaminoanthraquinone-2-carboxylic acid chloride and β-chlorethyl alcohol or ethylene glycol, or ethylene glycol monomethyl ether instead of the allyl ester of 1:4-diaminoanthraquinone-2-carboxylic acid.

Example 11

A mixture of 2.55 parts of 2-N-methylanilino-4:6-dichloro-1:3:5-triazine, 7.1 parts of 1:4-diaminoanthraquinone-2-carboxylic acid isobutyl ester and 168 parts of trichlorobenzene is stirred for 3 hours at 170–173° C., then allowed to cool, suction-filtered, and the residue is washed with methanol and dried, to yield 6.7 parts of a blue crystalline powder which dyes cotton from a red-brown vat very fast, pure reddish blue tints.

A blue vat dyestuff is likewise obtained, when the phenyl ester instead of the isobutyl ester of 1:4-diaminoanthraquinone-2-carboxylic acid is used.

Example 12

A mixture of 1.93 parts of 2-dimethylamino-4:6-dichloro-1:3:5-triazine, 7.1 parts of 1:4-diaminoanthraquinone-2-carboxylic acid isobutyl ester and 168 parts of trichlorobenzene is stirred for 3 hours at 170–173° C., then allowed to cool, suction-filtered, and the filter cake is washed with methanol and dried, to yield 6.4 parts of a blue crystalline powder which melts at 295–297° C. and dyes cotton from a red vat very fast and pure reddish blue tints.

When 2-diethylamino-4:6-dichloro-1:3:5-triazine is used instead of 2-dimethylamino-4:6-dichloro-1:3:5-triazine, the resulting dyestuff produces similar tints.

When 2-amino-4:6-dichloro-1:3:5-triazine is used instead of 2-dimethylamino-4:6-dichloro-1:3:5-triazine, a dyestuff is obtained which likewise dyes cotton blue tints.

Example 13

A mixture of 6.76 parts of 1:4-diaminoanthraquinone-2-carboxylic acid isobutyl ester and 1.84 parts of cyanuric chloride is stirred with 100 parts of nitrobenzene and within 5 minutes heated to 90° C. and then within 15 minutes to 120° C. The mixture is then stirred for 5 hours at 120 to 125° C., allowed to cool, suction-filtered, and the filter cake is washed with methanol and dried, to yield a blue powder which dyes cotton from a red-brown vat strongly reddish blue tints. The product still contains chlorine.

A similar product is obtained when trichlorobenzene is used instead of nitrobenzene and the reaction mixture is stirred for 16 hours at 100–105° C.

2.45 parts of the product obtained as described in the first paragraph above are stirred with 15 parts of aniline for 10 hours at 155–160° C., then allowed to cool, filtered, and the filter residue is washed with methanol and dried, to yield blue crystals which dye cotton from a red-brown vat very fast and pure reddish blue tints.

A dyestuff which produces very similar dyeings and has very similar properties is obtained when the dyestuff obtained as described in the second paragraph above is used as parent dyestuff.

Example 14

A mixture of 1.13 parts of 4-phenyl-2:6-dichloro-1:3:5-triazine, 3.4 parts of 1:5-diaminoanthraquinone-2-carboxylic acid isobutyl ester and 42 parts of trichlorobenzene is stirred for 3 hours at 170–173° C., then allowed to cool, suction-filtered, and the filter cake is washed first with a small quantity of trichlorobenzene and then with methanol, and dried, to yield 2.3 parts of a red-orange, crystalline powder which dyes cotton from an orange-brown vat fast red tints. The analysis—nitrogen: calculated 11.82%, found 11.99%—reveals that this dyestuff is the condensation product of 1 molecular proportion of 4-phenyl-2:6-dichloro-1:3:5-triazine and 2 molecular proportions of 1:5-diaminoanthraquinone-2-carboxylic acid isobutyl ester.

The 1:5-diaminoanthraquinone-2-carboxylic acid isobutyl ester used in the first paragraph above is prepared in the following manner:

The 5-nitroanthraquinone-1:2-isoxazole prepared as described in Example 2 of German specification 360,422 by treating 1:5-dinitro-2-methylanthraquinone with fuming sulfuric acid is split, according to the process described in Example 3 of German specification 464,863, by being heated with dilute sodium hydroxide solution at 80 to 90° C., to form the 1-amino-5-nitroanthraquinone-2-carboxylic acid, and its acid chloride is then formed in nitrobenzene with thionyl chloride (chlorine: calculated 10.72%, found 10.86%). The acid chloride is then converted, by being heated for 2 hours at the boil with an excess of isobutanol, into the 1-amino-5-nitroanthraquinone-2-carboxylic acid butyl ester (nitrogen: calculated 7.61%, found 7.60%). The nitro group is advantageously reduced catalytically in dimethyl formamide, to yield orange-red crystals melting at 150–152° C. and containing 8.25% of nitrogen (theory: 8.28%).

*Example 15*

1 part of the dyestuff obtained as described in Example 2 is vatted in 100 parts of water, containing 4 parts by volume of sodium hydroxide solution of 30% strength, with 2 parts of sodium hydrosulfite at 45° C. The stock vat prepared in this manner is added to a solution of 4 parts by volume of sodium hydroxide solution of 30% strength and 2 parts of sodium hydrosulfite in 2000 parts of water. 100 parts of cotton are dyed in the resulting dyebath for 1 hour at 40–50° C. with the addition of 10 parts of sodium chloride. The cotton is then squeezed, oxidized in air, rinsed, acidified, again rinsed and soaped at the boil. It is dyed a very fast blue tint.

What is claimed is:

1. An anthraquinone vat dyestuff of the formula

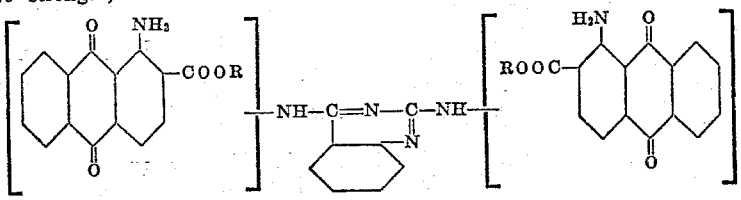

wherein R is a member selected from the group consisting of lower alkyl, cyclohexyl, phenyl-lower alkyl and phenyl.

2. The anthraquinone dyestuff of the formula

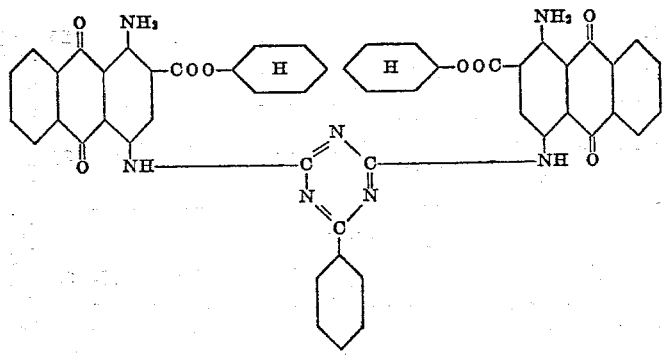

3. The anthraquinone dyestuff of the formula

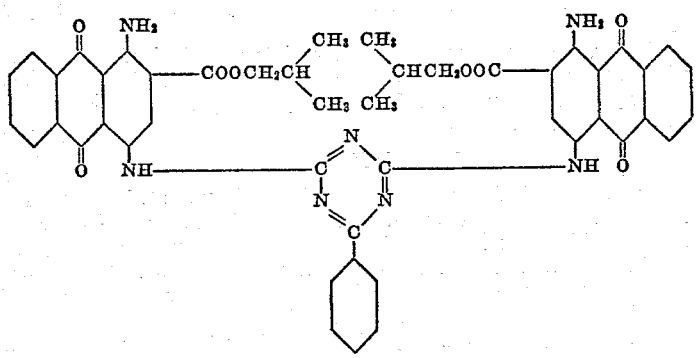

4. The anthraquinone dyestuff of the formula

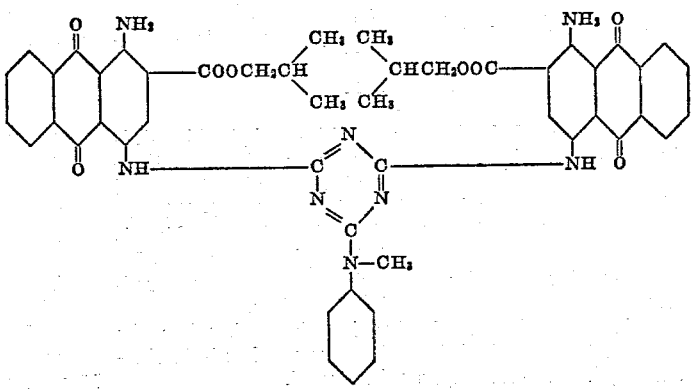

5. The anthraquinone dyestuff of the formula
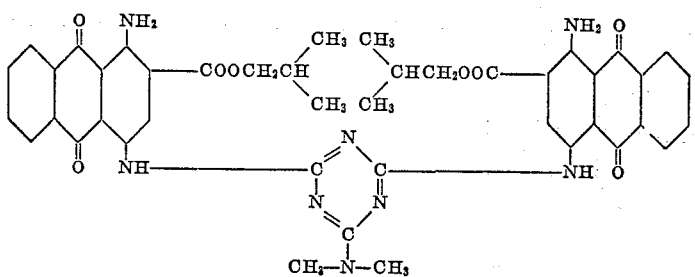
6. The anthraquinone dyestuff of the formula
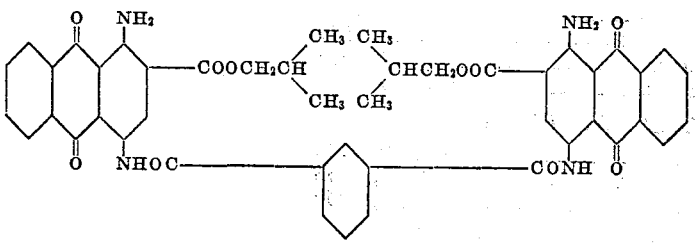
7. An anthraquinone vat dyestuff of the formula
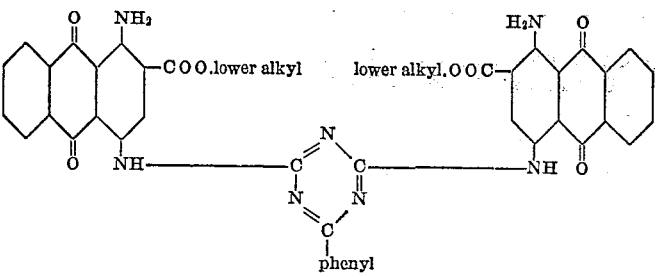
8. An anthraquinone vat dyestuff of the formula
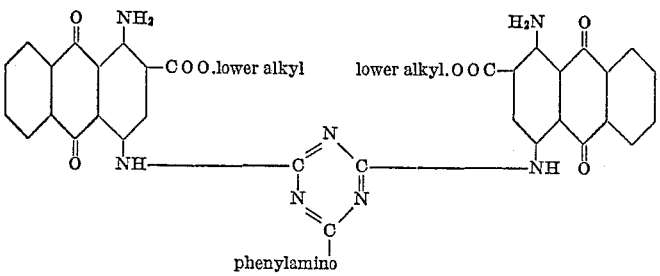
wherein the connection between the triazinyl radical and the phenylamino is through amino nitrogen of the latter.
9. An anthraquinone vat dyestuff of the formula
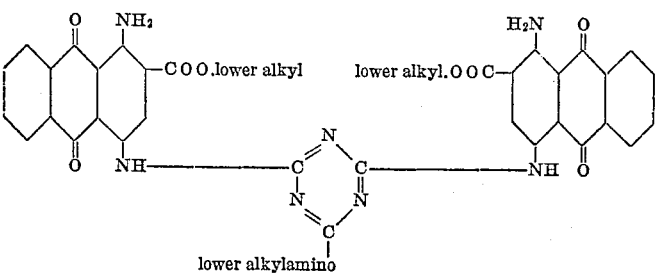

wherein the connection between the triazinyl radical and the lower alkylamino is through amino nitrogen of the latter.

10. An anthraquinone vat dyestuff of the formula

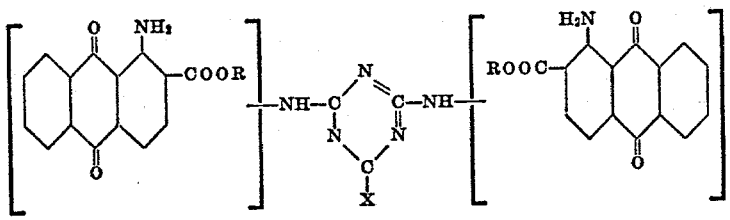

wherein X is a member selected from the group consisting of phenyl, amino, lower alkylamino and phenylamino; and R is a member selected from the group consisting of lower alkyl, cyclohexyl, phenyl-lower alkyl and phenyl.

References Cited in the file of this patent

UNITED STATES PATENTS

| | | |
|---|---|---|
| 1,966,125 | Koeberle | July 10, 1934 |
| 2,132,829 | Moser et al. | Oct. 11, 1938 |
| 2,598,587 | Moergeli | May 27, 1952 |
| 2,870,172 | Schoenauer | Jan. 20, 1959 |

FOREIGN PATENTS

| | | |
|---|---|---|
| 1,022,168 | France | Dec. 10, 1952 |
| 680,857 | Great Britain | Oct. 15, 1952 |
| 808,603 | Great Britain | Feb. 4, 1959 |

OTHER REFERENCES

Neblette, "Photography," 4th edition, page 348, Van Nostrand and Company (1943).

Venkataraman, "The Chemistry of Synthetic Dyes," volume 1, pages 342 and 348, Academic Press Inc., New York (1952).

Venkataraman, "The Chemistry of Synthetic Dyes," volume II, pages 808 to 809 and 888 to 889, Academic Press, New York (1952).